Figure 1:
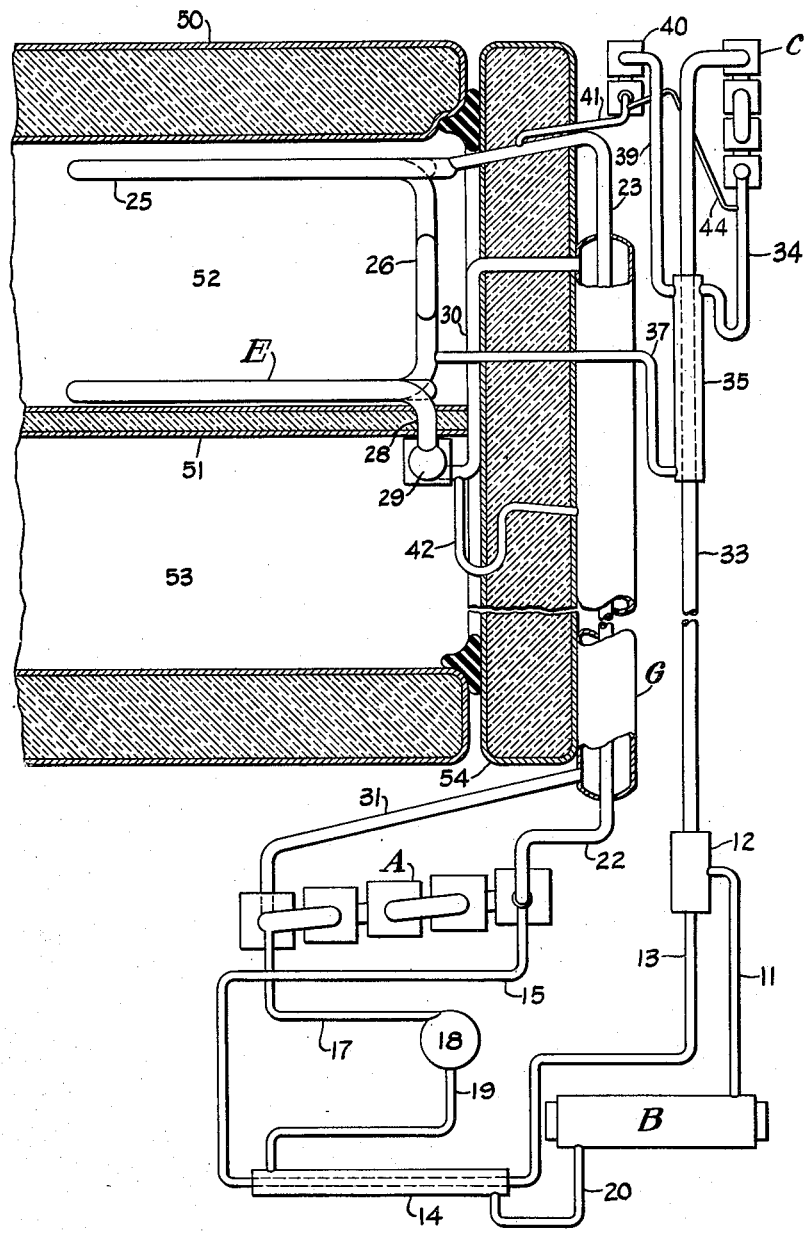

Patented May 20, 1952

2,597,813

UNITED STATES PATENT OFFICE 2,597,813

ABSORPTION REFRIGERATING APPARATUS

Glenn T. Piper, Louisville, Ohio, assignor to The Hoover Company, North Canton, Ohio, a corporation of Ohio Application December 24, 1948, Serial No. 67,129

7 Claims. (Cl. 62—119.5)

1

The present invention relates to the art of refrigeration and more particularly to a refrigerating apparatus of the pressure equalized absorption type arranged to secure most efficient refrigerating conditions in the cabinet for preserving sharp frozen food stuffs.

A highly effective utilization of the available storage space within a refrigerator cabinet is realizable by providing for ice freezing and low temperature storage in a shallow horizontally extending chamber located just beneath the top insulating wall of the cabinet construction. Various practical considerations necessitate placing the principal cooling element or evaporator of the system in the bottom wall or on top of the bottom insulating wall of this shallow refrigerating chamber. For purposes of producing ice in the conventional ice tray this is an ideal arrangement as it permits the trays to be spread out horizontally with their metallic, high heat conducting portions resting directly upon the refrigerated surface. It has however been found that this arrangement of low temperature compartments has a serious drawback from the standpoint of preserving sharp frozen food stuffs. In order to maintain sufficiently low temperatures in the upper portion of the shallow compartment to preserve sharp frozen food stuffs it is necessary to carry extraordinary low temperatures on the evaporator at temperatures which are not readily realizable with the absorption of refrigerating apparatus particularly if it is of the three fluid gravity circulation type. The three fluid pressure equalized type of absorption refrigerating machine possesses an additional disadvantage in this connection in that it is impractical to place the evaporator at any higher level in the food preserving compartment because of the gravity feed from the condenser to the evaporator. If the apparatus is of the type in which the inert gas positively propels the liquid refrigerant upwardly through the evaporator the upper portions of the evaporator are those which are warmest and hence are not conducive to producing air circulation within the storage compartment.

It is a particular object of the present invention to provide a refrigerating apparatus having an upper shallow low temperature refrigerating compartment in the upper part of the cabinet structure in which the main refrigerating effect is concentrated along the upper surface of the bottom wall of the compartment and in which a supplementary somewhat lower temperature refrigerating effect of minor capacity is concentrated in the very topmost portion of the re-

2 frigerated compartment. The foregoing construction provides the conditions which are ideal for the freezing of ice and at the same time insures cold air circulation through the storage compartment for preserving sharp frozen food stuffs without requiring excessively low temperatures in any part of the apparatus.

It is a further object of the present invention to provide an absorption refrigerating apparatus of the pressure equalized type having a principal condenser which supplies refrigerant to an evaporator positioned in the bottom of a low temperature refrigerating compartment, combined with means for revaporizing and recondensing a small amount of substantially pure anhydrous refrigerant from the condensate discharged from the principal condenser and for supplying this refrigerant to a supplementary low temperature evaporator positioned in the top portion of the low temperature refrigerating compartment.

Figure 2:
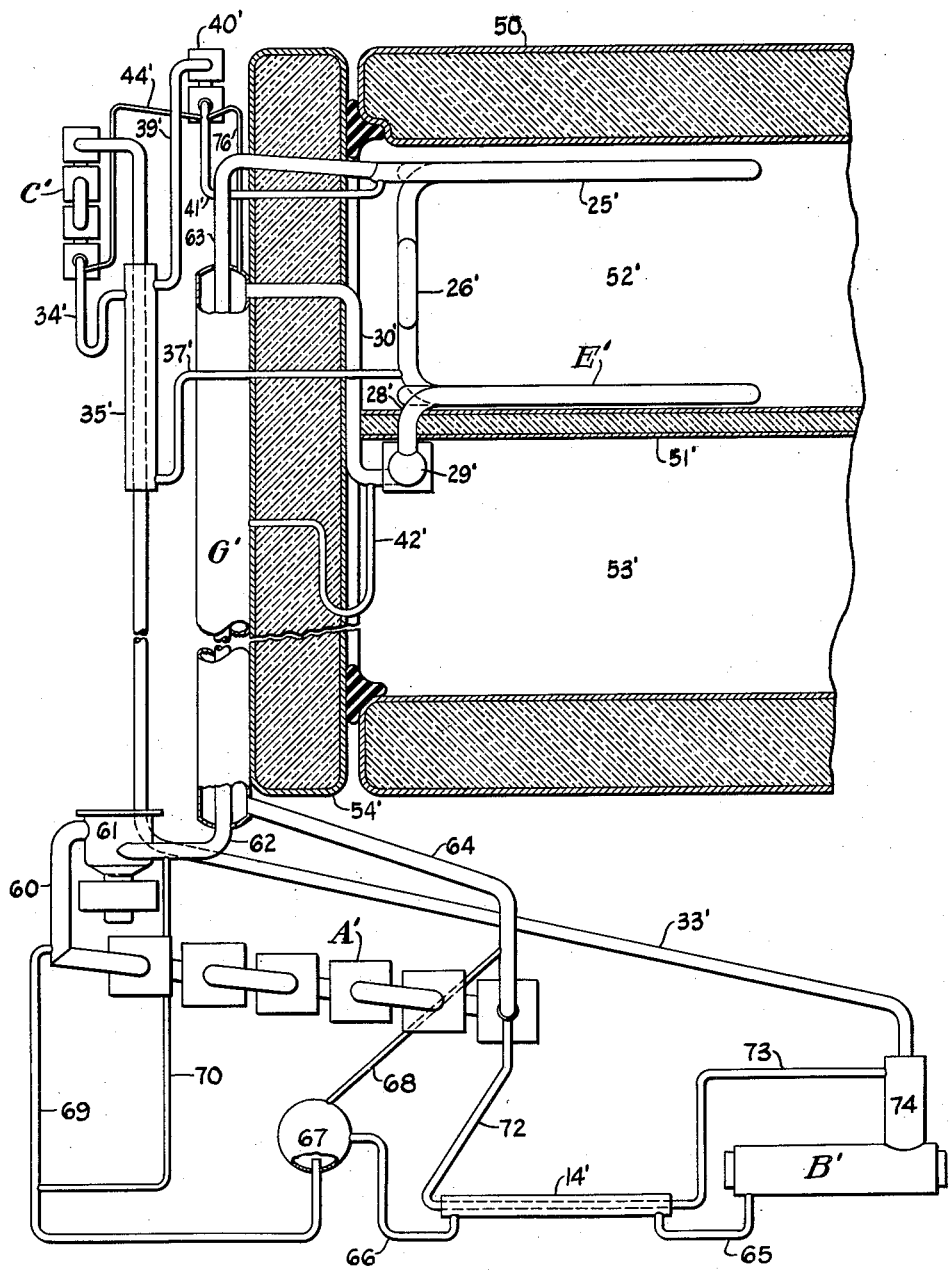

Other objects and advantages of the invention will become apparent as the description proceeds when taken in connection with the accompanying drawings in which:

Figure 1 illustrates a refrigerating apparatus embodying the present invention wherein the cabinet structure is shown in vertical elevational section and the refrigerating apparatus is shown partly schematically and Figure 2 illustrates a modification of the invention shown in accordance with the same plan used in the illustration of Figure 1.

Referring now to the drawing in detail and first to Figure 1 thereof, there is illustrated a refrigerating system of the pressure equalized absorption type which is charged with a refrigerant such as ammonia, an absorbent such as water and an inert pressure equalizing medium such as hydrogen.

Heat will be applied by any suitable means, not shown, to the generator B which contains a solution of the refrigerant in the absorbent. Heat so applied to the generator evolves refrigerant vapor therefrom which operates a vapor lift pump conduit 11 to convey the vapor and solution from which refrigerant has been evolved into a gas separation chamber 12. The lean solution is conveyed from the gas separation chamber 12 through conduit 13, a liquid heat exchanger 14 and a conduit 15 into the upper end of a tubular air cooled absorber conduit A. The lean solution flows downwardly through the absorber A in heat exchange relation with cooling air and in contact with a mixture of refrigerant vapor and inert gas flowing counter-current thereto. The solution absorbs refrigerant vapor from the mixture to produce strong absorbing solution which then flows through conduit 17, reservoir 18, conduit 19, solution heat exchanger 14 and conduit 20 to return to the generator B and complete the absorbing solution circuit.

The inert gas of low refrigerant vapor content which is formed in the absorber A is conveyed therefrom through the conduit 22, the inner passage of the gas heat exchanger G and conduit 23 which opens into a low temperature or supplementary evaporator 25. After traversing the evaporator 25 the inert gas flows downwardly through the sinuous evaporator conduit 26 and enters the principal evaporator E. The evaporators 25, 26, and E are each formed of elongated sinuous conduits arranged in a manner to be described more fully hereinafter.

After traversing the principal evaporator E, the inert gas flows through a conduit 28 into an elongated finned air cooling evaporator conduit 29. After traversing the conduit 29, the inert gas returns to the absorber through the conduit 30, the outer path of the gas heat exchanger G and the conduit 31 thus completing the inert gas circuit.

The refrigerant vapor which is separated from absorbing solution in the separating chamber 12 flows through a conduit 33 to the upper portion of a tubular air cooled condenser C. Condensate formed in the condenser C flows through a conduit 34, having a U-shaped portion to form a liquid filled gas sealing trap, into a re-evaporating vessel 35 which surrounds the hot vapor conduit 33. The major portion of the refrigerant supplied to the vessel 35 flows through a conduit 37 into the gas inlet portion of the evaporator E wherein it meets and evaporates into the inert gas to produce refrigeration. The conduit 37 enters the bottom portion of the vessel 35 and then has a vertically extending leg to form a U-shaped liquid filled trap with the vessel 35 to insure that a major portion of vessel 35 is flooded with liquid refrigerant.

A portion of the liquid refrigerant supplied to the vessel 35 is vaporized by heat derived from the hot vapors flowing through the conduit 33. This rectifies the vapors flowing through the conduit 33 by condensing absorbent vapors. The condensate formed in conduit 33 returns to the gas separation chamber 12. The vapor evolved in the vessel 35 is substantially pure anhydrous ammonia. The pure refrigerant vapor formed in the vessel 35 is conducted by a conduit 39 to a small tubular air cooled condenser 40 wherein it is liquefied. The liquid formed in the condenser 40 flows through a conduit 41 into that portion of the gas supply conduit 23 which directly joins the evaporator 25. The quantity of refrigerant supplied to evaporator 25 will vary with varying designs and specifications; in general, approximately 25% of the quantity of liquid condensed in the principal condenser is revaporized, recondensed and supplied to the low temperature evaporator.

The small amount of substantially pure refrigerant supplied to the evaporator 25 meets the leanest inert gas in the system hence this refrigerant evaporates at a low temperature level and without greatly enriching the inert gas. As a consequence of this the refrigerating effect produced in the evaporators 25 and 26 is in general at a lower temperature than that produced in the principal evaporator E. Any refrigerant or other material which may pass through the evaporators 25 and 26 in the liquid state simply discharges into the evaporator E along with the inert gas at the point at which it meets the liquid refrigerant supplied by the conduit 37. Thus the inert gas is partially enriched in the evaporators 25 and 26 accompanied by production of low temperature refrigeration and is further enriched in the evaporators E and 29 accompanied by higher temperature level production of refrigeration. Preferably the system is so proportioned that some liquid refrigerant will traverse the evaporator E and flow into the evaporator 29 to evaporate at that point for air cooling purposes as will be described more fully hereinafter. Any liquid material which has traversed all of the evaporating system without vaporizing is drained from the inert gas discharge conduit 30 through a trap sealed drain conduit 42 which discharges into the outer or rich gas passage of the gas heat exchanger G.

A vent conduit 44 is connected between the condenser side of the trap in the conduit 34 and the discharge conduit 41 of the condenser 40. Since the conduit 41 does not include a liquid filled gas trap gaseous and vapor materials supplied thereto can flow directly into the inert gas circuit along with the liquid.

As shown in Figure 1 the refrigerating system in general is illustrated schematically except that the relation of the condensers and evaporators to each other and to the refrigerating cabinet is shown as a complete assembled structure. The refrigerating cabinet comprises an insulated compartment structure 50 internally divided by an insulated partition 51 into an upper low temperature freezing and storage chamber 52 and an air cooling chamber 53. The rear insulated wall 54 of the cabinet structure will be constructed as part of the refrigerating apparatus and assembled with the cabinet when the refrigerating apparatus is secured thereto. Optionally the insulated wall 51 may be a part of this sub-assembly rather than a part of the principal cabinet.

The evaporator 25 is in the form of a sinuous conduit lying in the very topmost portion of the compartment 52 and covering the major portion of the area thereof. The evaporator coil 26 is in the form of a sinuous conduit lying against the rear wall of the compartment 52 and also covering a major portion of the area thereof. The principal evaporator E lies on top of the insulated partition 51 and is in the form of a sinuous conduit covering substantially the entire upper surface of the partition 51. A suitable shelf or plate, not shown, will overlie and be mounted on the evaporator E to form a flat surface upon which ice trays or similar articles may be supported. The evaporator 29 is positioned in the upper rear corner of the compartment 53 in order to refrigerate the same for the preservation of food stuffs and the like. The evaporator 29 will be proportioned to maintain a temperature of 45° F., for example, and therebelow, in the compartment 53 which is sufficient for the preservation of ordinary fresh food stuffs without freezing the same and without unduly reducing the humidity within the compartment 53 to produce undesirable drying of fresh vegetables.

With the above described arrangement the major refrigerating capacity for low temperature purposes is concentrated in the evaporator E which overlies substantially the entire top surface of the insulated partition 51 and upon which ice trays and the like will be seated. By this means a direct and extensive heat transfer path between the heat conducting portions of ice freezing trays and the evaporator is provided which is a most desirable condition for rapid production of ice. The evaporator 25 receives the leanest inert gas available in the system and a comparatively small amount of substantially pure anhydrous ammonia hence it operates at a lower temperature and has less capacity than the evaporator E. By placing the colder evaporator 25 in the top of the compartment 52 circulation of air within that compartment is assured, hence food stuffs or other material piled one on top of another will be maintained at temperatures low enough for safe preservation thereof.

The lower portion of the principal condenser C extends below the evaporator 25, but the condenser 40 is much smaller than condenser C and can be placed in the customary air cooling compartment at the rear of the cabinet in position to supply evaporator 25 by gravity without extending above the top wall of the cabinet structure 50.

The trap in the conduit 34 prevents the vapors formed in the evaporating chamber 35 from passing back to the condenser C. By this means a substantially fixed proportion of liquid produced in the condenser C will always be re-evaporated, recondensed in the condenser 40 and supplied to the evaporator 25. Because the liquid which is supplied to the re-evaporating chamber 35 is liquid ammonia with a minor amount of absorbent liquid present as an impurity the vapors formed in the chamber 35 are almost pure anhydrous ammonia. By so supplying pure ammonia to the upper evaporator its function as a lower temperature element is facilitated.

Referring now to Figure 2 a modified form of the invention is illustrated. This apparatus is of the type in which the inert gas is positively propelled by a mechanical pump and for this purpose it is preferable to use a dense inert gas such as nitrogen. In this form of the invention certain portions of the apparatus are identical with corresponding portions of the apparatus illustrated in Figure 1; they are therefore given the same reference character distinguished by the addition of a prime.

The lean inert gas formed in the air cooled absorber A' flows through a conduit 60 into the suction side of an electric motor driven gas pump 61. The inert gas is placed under pressure in the pump 61 and is discharged therefrom into the evaporator 25' through the gas conduit 62, the inner passage of the gas heat exchanger G' and the gas conduit 63. The inert gas thus flows through the evaporators 25', 26', E' and 29' serially in the order named. After traversing the evaporator 29' the inert gas flows through the conduit 30', the outer passage of the gas heat exchanger G' and a conduit 64 which connects to the lower end of the absorber A' thus completing the principal inert gas circuit.

The lean absorbing solution formed in the generator B' by the evolution of refrigerant vapor therefrom flows through the conduit 65, the liquid heat exchanger 14', the conduit 66 into a reservoir 67. A vent conduit 68 connects the upper portion of the reservoir to the rich inert gas return conduit 64 which is a low pressure area. Conduit 68 thus maintains a low pressure in reservoir 67 and also purges the same of vapors or gasses. The lean solution is conveyed from the reservoir to the upper end of the absorber A' through a gas lift pump conduit 69.

Pumping gas is supplied to the pump conduit 69 below the liquid level maintained therein by the reservoir 67 by means of a conduit 70 which receives inert gas under pressure from the pump discharge conduit 62. The solution flows downwardly through the absorber A' in counterflow relationship with and in contact with the inert gas refrigerant vapor mixture supplied to the lower end of the absorber by the conduit 64. The solution absorbs refrigerant from the inert gas refrigerant vapor mixture to form rich solution. Rich solution flows out of the lower end of the absorber through the conduit 72, liquid heat exchanger 14' and conduit 73 which opens into an analyzer 74 mounted upon and in open communication with the generator B'. The solution traverses the analyzer back to the generator thus completing the solution circuit.

The refrigerant vapor evolved in the generator B' traverses the analyzer 74 and then flows through the conduit 33' in heat exchange relation with the re-evaporating vessel 35' to the condenser C'. The dual condenser and re-evaporating structure of this form of the invention is substantially identical with that described in connection with Figure 1.

The substantially anhydrous liquid ammonia recondensed in the condenser 40' and supplied to the evaporator 25' through the conduit 41' meets lean inert gas supplied through the conduit 63 and produces very low temperature refrigeration in the evaporators 25' and 26'. The partially enriched inert gas then flows into the evaporator E' wherein it meets the principal body of liquid refrigerant supplied through the conduit 37' from the re-evaporating vessel 35'. Any liquid which is unevaporated in its path of flow through the evaporator E', conduit 28' and evaporator 29' is drained to the gas heat exchanger through the trap sealed conduit 42' so that it may return to the solution circuit through the inert gas return conduit.

The evaporators 25', 26', E' and 29' in this form of the invention will be arranged identically with the correspondingly numbered evaporators of the Figure 1 form of the invention and will perform substantially the same functions. In this form of the apparatus the evaporators may be of the type in which the inert gas flows with a velocity sufficient to propel the liquid refrigerant through the evaporators if desired whereas in the Figure 1 form of the apparatus the liquid refrigerant must traverse the evaporators under the propulsion of gravity.

In this form of the invention the vent conduit 68 and the connection of the conduit 72 to the lower end of the absorber maintains the generator analyzer end of the solution circuit at a pressure approaching the suction pressure of the gas pump 61. The vent conduit 44' connects to the discharge conduit 41' of the condenser 40' adjacent its connection to the condenser. The conduit 41' is U-shaped so as to form a liquid filled gas sealing trap. Uncondensed matter which reaches the conduit 41' from either condenser is then purged through the vent conduit 76 to the outer passage of the gas heat exchanger G' which is the rich gas return portion of the apparatus. This venting structure maintains the condensers at a pressure approaching the suction pressure of the gas pump 61 hence non-condensed matter can flow freely into the low pressure side of the inert gas circuit without the creation of a pressure differential which might tend to draw off large quantities of condensible vapors. Since the condenser C' and re-evaporating vessel 35' are maintained at a pressure which is lower than the gas pressure prevailing in the evaporating system at the junction of the evaporator and conduit 37' the liquid level will stand in the vessel 35' above the point of connection of conduit 37' to the evaporator to balance the pressure differential.

Both forms of the invention realize the advantages of a low height horizontally elongated low temperature ice freezing and frozen food storage compartment in the top portion of the refrigerated cabinet of a pressure equalized type refrigerating system. This is accomplished without extending any portions of the apparatus above the top plane of the cabinet proper and without creating a condition within the low temperature compartment which permits food stuffs maintained in the top portion thereof to reach undesirably high temperatures. The provision of the low temperature evaporator 25 in the top of the compartment assures circulation of air over stacked up frozen food stuffs while the principal ice freezing load of the system is carried on a flat plate type evaporator structure upon which the ice trays may rest so as to have maximum efficiency of heat transfer between water to be frozen and the large capacity evaporator in the system. This arrangement is doubly advantageous because the major portion of the capacity of a compartment such as the compartment 52 or 52' is required for the purpose of producing ice. Very small refrigerating capacity is required to maintain sharp frozen food stuffs at safe temperature levels hence the low temperature refrigeration produced by the evaporator 25 and the evaporator E acting in conjunction with each other is amply sufficient to satisfy this need.

The specific means herein disclosed and claimed for condensing the refrigerant evolved in the generator B and for supplying separate portions of the condensate to the evaportors E and 25 is disclosed but not claimed in the application of Curtis C. Coons, Serial No. 51,554, filed September 28, 1948, and assigned to the assignee of this application.

The attainment of the objectives of this invention through the dual condenser and re-evaporating chambers 35 or 35' may necessitate a somewhat higher heat imput to the boiler than would be customary with comparable machines of more conventional design. That is, the vapors flowing from the generating assembly through the re-evaporating chamber heating conduit may desirably contain a larger percentage of absorption solution vapor than is customary. An appreciable quantity of absorbent vapor can be condensed in the conduit 33 or 33' to evolve substantially pure anhydrous refrigerant vapor for the secondary condenser from the condensate discharging from the principal condenser.

While I have illustrated and described the invention in considerable detail, it is to be understood that various changes may be made in the arrangement, proportion and construction of parts without departing from the spirit of the invention or the scope of the appended claims.

I claim:

1. In a refrigerator, an insulated freezing chamber, a first evaporator arranged to refrigerate the lower portion of said chamber, a second smaller capacity evaporator arranged to refrigerate the upper portion of said chamber, a generator containing a solution of refrigerant in an absorbent, a first large air cooled condenser, a second air cooled condenser of less capacity than said first condenser, conduit means for conducting hot vapors from said generator to said first condenser, a vaporizing jacket surrounding a part of said conduit means, conduit means including a U-shaped portion forming a liquid retaining trap for conducting condensate from said first condenser to said jacket, conduit means including a liquid filled trap portion for conveying condensate from said jacket to said first evaporator, means for conveying refrigerant vapor from said jacket to said second condenser, and means for conveying refrigerant liquid from said second condenser to said second evaporator.

2. Refrigerating apparatus comprising an insulated cabinet structure, a horizontal partition in said cabinet dividing the interior thereof into an upper freezing chamber and a lower food storage chamber, an absorption refrigerating apparatus associated with said cabinet structure comprising a first evaporator arranged to refrigerate said freezing chamber adjacent the bottom thereof, a second evaporator arranged to refrigerate said freezing chamber adjacent the top thereof, a third evaporator arranged to refrigerate said food storage chamber, a generator and an absorber connected for circulation of absorption solution therebetween, means for circulating inert gas from said absorber through said second and first and third evaporators serially and back to said absorber, means for conveying hot vapors from said generator to a first principal condenser in which vapors are liquefied, a vaporizing chamber in heat exchange with a portion of said hot vapor pipe from which condensate can return by gravity to said generator, means including said vaporizing chamber for conveying condensate from said first condenser to said first evaporator including means to prevent vapor formed in said vaporizing chamber from flowing through the other portions of said conveying means, means for conveying vapor formed in said vaporizing chamber to said second condenser, means for flowing condensate from said second condenser to said second evaporator, and means for conducting non-condensed matter from said condensers to a portion of the apparatus normally containing inert gas.

3. Refrigerating apparatus of the pressure equalized absorption type including a first evaporator, a second evaporator positioned in spaced relation to said first evaporator, a source of hot refrigerant vapor, first and second condensers, means for conducting refrigerant vapor from said source to said first condenser, means for conveying refrigerant liquid from said first condenser through a U-shaped conduit forming a liquid filled vapor seal and thence to said first evaporator in heat exchange with said refrigerant vapor conveying means, said refrigerant liquid conveying means including trap means also to prevent vapors formed by said heat exchange from flowing into said first evaporator, means for conveying refrigerant vapors evolved in said last mentioned conveying means to said second condenser, and means for conveying condensate from said second condenser to said second evaporator.

4. That method of producing refrigeration which includes the steps of applying heat to a solution of refrigerant in an absorbent to evolve vapors therefrom, liquefying such vapors to form condensate, passing said condensate in heat exchange with said vapors to evolve substantially pure refrigerant vapor by vaporizing a portion of said condensate and to condense non-refrigerant vapor from said first mentioned vapors, condensing said substantially pure refrigerant vapor separately from said first mentioned vapors to form substantially pure refrigerant liquid, passing solution from which refrigerant has been evolved into contact with an inert gas refrigerant vapor mixture to absorb refrigerant vapor therefrom, passing inert gas from which refrigerant vapor has been removed into contact with said substantially pure refrigerant liquid to produce a first low temperature refrigerating effect, and separably evaporating the remaining portion of said first mentioned condensate into said inert gas which has been enriched by vaporization of said substantially pure refrigerant liquid to produce a second higher temperature refrigerating effect.

5. In a refrigerator; a cabinet structure having a freezing compartment overlying a food storage compartment, a refrigerating apparatus associated with said cabinet structure comprising a generator and an absorber connected to form an absorbing solution circuit, means forming an inert gas circuit in which inert gas of reduced refrigerant vapor content flows by gravity from said absorber through a first evaporator positioned in the top of said freezing compartment and then through a second evaporator positioned in the bottom of said freezing compartment and then through a third evaporator positioned in said food storage compartment, a principal condenser, means for conveying hot vapors from said generator to a first condenser, means for conveying condensate from said first condenser to said second evaporator in heat exchange with said hot vapors flowing to said first condenser, said last mentioned conveying means including means for preventing vapors formed by said heat exchange from flowing into said first condenser or said second evaporator, a second condenser connected to receive vapors evolved from condensate discharged from said first condenser and to supply refrigerant liquid to said first evaporator, and means for relieving both of said condensers of non-condensible gasses.

6. Refrigerating apparatus of the pressure equalized absorption type including a first evaporator, a second evaporator positioned in spaced relation to said first evaporator, a generator, an absorber, means for circulating an absorbing solution through said generator and said absorber, means for circulating an inert gas through said second and first evaporator in that order and back to said absorber, first and second condensers, means for conducting refrigerant vapor from said generator to said first condenser, means including a U-shaped conduit connected to said first condenser and forming a liquid filled vapor seal for conveying refrigerant liquid from said first condenser to said first evaporator in heat exchange with said refrigerant vapor conveying means, means for conveying refrigerant vapors evolved in said last mentioned conveying means to said second condenser, and means for conveying condensate from said second condenser to said second evaporator.

7. In a refrigerator, an insulated freezing chamber, a first evaporator arranged to refrigerate the lower portion of said chamber, a second smaller capacity evaporator arranged to refrigerate the upper portion of said chamber, a generator containing a solution of refrigerant in an absorbent, an absorber, means for circulating absorbent between said absorber and said generator, means for circulating an inert gas from said absorber through said second and first evaporators and back to said absorber, a first air cooled condenser, a second air cooled condenser of less capacity than said first condenser, conduit means for conducting hot vapors from said generator to said first condenser a vaporizing jacket surrounding a part of said conduit means, conduit means including a U-shaped conduit forming a liquid retaining trap for conducting condensate from said first condenser to said jacket, conduit means including a liquid filled trap portion for conveying condensate from said jacket to said first evaporator, means for conveying refrigerant vapor from said jacket to said second condenser, and means for conveying refrigerant liquid from said second condenser to said second evaporator.

GLENN T. PIPER.

REFERENCES CITED

The following references are of record in the file of this patent:

UNITED STATES PATENTS

| Number | Name | Date |
| --- | --- | --- |
| 2,064,233 | Thomas | Dec. 15, 1936 |
| 2,069,865 | Ullstrand | Feb. 9, 1937 |
| 2,116,998 | Ehnbom | May 10, 1938 |
| 2,194,505 | Kogel et al. | Mar. 26, 1940 |
| 2,289,078 | Schellens et al. | July 7, 1942 |
| 2,298,029 | Blomqvist | Oct. 6, 1942 |
| 2,345,505 | Siedle | Mar. 28, 1944 |
| 2,400,191 | Coons | May 14, 1946 |